US012755142B2

(12) United States Patent
Amir et al.

(10) Patent No.: US 12,755,142 B2
(45) Date of Patent: Oct. 6, 2026

(54) CHIPS SUPPORTING CONSTANT TIME PROGRAM CONTROL OF NESTED LOOPS

(71) Applicant: INTERNATIONAL BUSINESS MACHINES CORPORATION, Armonk, NY (US)

(72) Inventors: Arnon Amir, San Jose, CA (US); Andrew Stephen Cassidy, San Jose, CA (US); Nathaniel Joseph McClatchey, San Jose, CA (US); Jun Sawada, Austin, TX (US); Dharmendra S. Modha, San Jose, CA (US); Rathinakumar Appuswamy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 17/076,180

(22) Filed: Oct. 21, 2020

(65) Prior Publication Data

US 2022/0121925 A1 Apr. 21, 2022

(51) Int. Cl.
*G06N 3/08* (2023.01)
*G06F 17/10* (2006.01)

(52) U.S. Cl.
CPC ............... *G06N 3/08* (2013.01); *G06F 17/10* (2013.01)

(58) Field of Classification Search
CPC ................................. G06N 3/08; G06F 17/10
See application file for complete search history.

(56) References Cited

U.S. PATENT DOCUMENTS 6,930,931 B2 8/2005 Matsuo
7,945,768 B2 5/2011 Essick, IV et al.
(Continued)

FOREIGN PATENT DOCUMENTS

CN 103282878 A 9/2013
CN 104838357 A 8/2015
(Continued)

OTHER PUBLICATIONS

Andreas Ibing et.al, IEEE 14th Intl Conf on Dependable, Autonomic and Secure Computing, 14th Intl Conf on Pervasive Intelligence and Computing, 2nd Intl Conf on Big Data Intelligence and Computing and Cyber Science and Technology Congress]), (Year: 2016).*
(Continued)

*Primary Examiner* — Li B. Zhen
*Assistant Examiner* — Tirumale K Ramesh
(74) *Attorney, Agent, or Firm* — Lily Neff

(57) ABSTRACT

Chips supporting constant time program control of nested loops are provided. In various embodiments, a chip comprises at least one arithmetic-logic computing unit and a controller operatively coupled to the at least one arithmetic-logic computing unit. The controller is configured according to a program configuration, the program configuration comprising at least one inner loop and at least one outer loop. The controller is configured to cause the at least one arithmetic computing unit to execute a plurality of operations according to the program configuration. The controller is configured to maintain at least a first loop counter and a second loop counter, the first loop counter configured to count a number of executed iterations of the at least one outer loop, and the second loop counter configured to count a number of executed iterations of the at least one inner loop. The controller is configured to provide a first indication of whether the first loop counter corresponds to a last iteration
(Continued)

and a second indication of whether the second loop counter corresponds to a last iteration. The controller is configured to alternatively increment, reset, or maintain each of the first and second loop counters according to the first and second indications.

16 Claims, 30 Drawing Sheets

(56) References Cited

U.S. PATENT DOCUMENTS

| | | | | |
|---|---|---|---|---|
| 7,996,661 | B2 | 8/2011 | Hanai et al. | |
| 8,793,675 | B2 | 7/2014 | Lin et al. | |
| 8,930,929 | B2 | 1/2015 | Ahn et al. | |
| 10,228,947 | B2 | 3/2019 | Woo et al. | |
| 10,732,945 | B1 | 8/2020 | Chirca et al. | |
| 11,144,291 | B1 * | 10/2021 | Zheng | G06N 3/042 |
| 2004/0085824 | A1 | 5/2004 | Matsuo | |
| 2006/0107028 | A1 | 5/2006 | Meuwissen et al. | |
| 2006/0182135 | A1 | 8/2006 | Pisek | |
| 2008/0141013 | A1 | 6/2008 | Klima et al. | |
| 2009/0083527 | A1 | 3/2009 | Hanai et al. | |
| 2009/0307472 | A1 | 12/2009 | Essick Iv et al. | |
| 2010/0169612 | A1 | 7/2010 | Persson et al. | |
| 2012/0102496 | A1 | 4/2012 | Ahn et al. | |
| 2014/0188961 | A1 | 7/2014 | Plotnikov et al. | |
| 2014/0189287 | A1 | 7/2014 | Plotnikov et al. | |
| 2016/0179549 | A1 | 6/2016 | Xekalakis et al. | |
| 2018/0121786 | A1 | 5/2018 | Narayanaswami et al. | |
| 2018/0189633 | A1 * | 7/2018 | Henry | G06N 3/045 |
| 2018/0341479 | A1 * | 11/2018 | Temam | G06F 9/3455 |
| 2018/0365561 | A1 | 12/2018 | Temam et al. | |
| 2020/0070352 | A1 * | 3/2020 | Larzaro-Gredilla | G06N 7/01 |
| 2020/0167158 | A1 | 5/2020 | Cassidy et al. | |
| 2020/0285950 | A1 * | 9/2020 | Baum | G06N 3/04 |

FOREIGN PATENT DOCUMENTS

| | | | |
|---|---|---|---|
| CN | 106485131 | A | 11/2016 |
| CN | 107450888 | A | 12/2017 |
| CN | 108268945 | A | 7/2018 |
| CN | 114386585 | A | 4/2022 |
| DE | 102021123286 | A1 | 4/2022 |
| GB | 2606596 | A | 11/2022 |
| JP | 2004-151990 | A | 5/2004 |
| JP | 2009-075875 | A | 4/2009 |
| JP | 2009-163514 | A | 7/2009 |
| JP | 2022-068117 | A | 5/2022 |

OTHER PUBLICATIONS

Trtík , Symbolic Execution and Program Loops, PhD. Thesis, Faculty of Informatics, Masaryk University, 2013]) (Year: 2013).*

Kim et al., "Improving Performance of Nested Loops on Reconfigurable Array Processors," ACM Transactions on Architecture and Code Optimization, 8(4), Article 32 (see highlighted sections): 1-23 (2012).

Search and Examination Report for United Kingdom Application No. GB2114616.2 dated Aug. 30, 2022.

Chen et al., "Diannao: A Small-Footprint High-Throughput Accelerator for Ubiquitous Machine-Learning." ACM SIGARCH Computer Architecture News 42 (2014): 269-284.

German Office Action for File No. 10 2021 123 286.4 dated May 13, 2024.

Zhang et al., "Optimizing FPGA-based accelerator design for deep convolutional neural networks." Proceedings of the 2015 ACM/SIGDA International Symposium on Field-Programmable Gate Arrays (FPGA '15). Association for Computing Machinery, 2015.

Japan Patent Office, "Notice of Reasons for Refusal" Apr. 1, 2025, 34 Pages, JP Application No. 2021-169269.

The State Intellectual Property Office of People's Republic of China, "Third Office Action", Feb. 26, 2026, 09 Pages, CN Application No. 202111219373.4.

* cited by examiner

200

602

```
// Example: a loop
for (int i = 0; i < N; i++) {
    p[i] += a[i] * w[i][i];
}
```

604

```
// Implementation using a conditional branch
        int i = 0
L1:     if i >= N GOTO END1
        p[i] += a[i] * w[i][i]
        i++
        goto L1
END1:
```

FIG. 6

702

```
// Example: two nested loops
for (int  i = 0;  i < N;  i++) {
    for (int  j = 0;  j < M;  j++) {
        p [ j ] += a [ i ] * w [ i ] [ j ];
    }
}
```

704

```
// Implementation using a conditional branch
         int  i = 0
L1:      if  i >= N GOTO END1
         int  j = 0
L2:      if  j >= M GOTO END2
         p [ i ] += a [ i ] * w [ i ] [ j ]   // loop body
         j++
         goto L2
END2:    i++
         goto L1
END1:
```

FIG. 7

802

```
// conditional branch AFTER body
        initialize1
L1:     initialize2
L2:     // loop body
        advance2
        if ! endcond2 GOTO L2
        advance1
        if ! endcond1 GOTO L1
```

804

```
// conditional branch BEFORE body
          initialize1
L1:       if endcond1 GOTO END1
          initialize2
L2:       if endcond2 GOTO END2
            // loop body
          advance2
          goto L2
END2:     advance1
          goto L1
END1:
```

FIG. 8

<table>
<tr><th>Normal Loop</th><th>After Loop Unrolling</th></tr>
<tr><td>

```
int x;
for (x = 0; x < 100; x++)
{
    delete(x);
}
```

</td><td>

```
int x;
for (x = 0; x < 100; x += 5)
{
    delete(x);
    delete(x + 1);
    delete(x + 2);
    delete(x + 3);
    delete(x + 4);
}
```

</td></tr>
</table>

FIG. 11

1202

```
// ORIGINAL TWO NESTED LOOPS
for (int i = 0; i < 32; i++) {
    for (int j = 0; j < 4; j++) {
        p[j] += a[i] * w[i][j];
    }
}
```

1204

```
// MERGED TO ONE LOOP
for (int k = 0; k < 32 * 4; k++)
        // hence j = k % 4 and i = k / 4
        p[k % 4] += a[k / 4] * w[k / 4][k % 4];
    }
```

FIG. 12 x86 Instruction Set Reference
LOOP/LOOPcc
Loop According to ECX Counter

| Opcode | Mnemonic | Description |
|---|---|---|
| E2 cb | LOOP re18 | Decrement count; jump short if count !=0. |
| E1 cb | LOOPE re18 | Decrement count; jump short if count !=0 and ZF=1. |
| E1 cb | LOOPZ re18 | Decrement count; jump short if count !=0 and ZF=1. |
| E0 cb | LOOPNE re18 | Decrement count; jump short if count !=0 and ZF=0. |
| E0 cb | LOOPNZ re18 | Decrement count; jump short if count !=0 and ZF=0. |

FIG. 13

1505

Let $LC_i$ denote the i-th Loop Counter. The circuit computes, at each cycle, the following triggers $e_i$, $l_i$, $r_i$, $a_i$ $e_i = (PC == EndAddr_i)$ // PC at End Instruction in loop $LC_i$ $l_i = (LC_i == N_i - 1)$ // Loop $LC_i$ Last iteration Assuming a single loop $LC_i$ then $a_i = e_i \cdot \overline{l_i}$ // Advance bit of loop $LC_i$ $r_i = e_i \cdot l_i$ // Reset bit of loop $LC_i$ Now the loop update cycle is given by

```
if (r_i == 1)        // reset
    LC_i = 0
else if (a_i == 1)   // advance
    LC_i ++
else
                     // do nothing
end
```

FIG. 15B

1805

Let $LC_i$ denote the i-th Loop Counter.
Without loss of generality, it is assumed that if $LC_j$ and $LC_i$ are co-ending, and loop $LC_j$ is nested in loop $LC_i$ then $j > i$.

$LC_i$ computes, at each cycle, the following triggers $e_i = (\boldsymbol{PC} == \textbf{EndAddr}_i)$ // PC at End Instruction in loop $LC_i$
$\boldsymbol{l}_i = (\boldsymbol{LC}_i == N_i - 1)$ // Loop $LC_i$ Last iteration
$t_i = \boldsymbol{e}_i \cdot \overline{l_i};$
$\boldsymbol{a}_i = t_i \cap_{j=i+1}^{M-1} \overline{t_j}$
$\boldsymbol{r}_i = \boldsymbol{e}_i \cdot \boldsymbol{l}_i \cdot \cap_{j=i+1}^{M-1} \overline{t_j}$ All loop counters $LC_i$ are updated by

```
parfor i=0:M-1          // parallel update
    if (r_i == 1)       // reset
        LC_i = 0
    else if (a_i == 1)  // advance
        LC_i ++
    else                // do nothing
    end
end
```

The PC updates by

```
if (∃a_i s.t. a_i == 1)
    PC = BeginAddr_i
else
    PC ++
end
```

FIG. 18B

NOTE: $\bigcap_{j=i+1}^{M}(\overline{e_i} \vee l_i) = \bigcap_{j=i+1}^{M}\overline{(e_i \cdot \overline{l_i})}$ Loop Counter Configuration:

| | |
|---|---|
| $\boldsymbol{i}$ | : index of loop counter |
| $BeginAddr_i$ | : Address of first instruction in loop $\boldsymbol{i}$ |
| $EndAddr_i$ | : Address of last instruction in loop $\boldsymbol{i}$ |
| $Count_i$ | : loop count--number of times to execute loop |
| $Inf_i$ | : true if this loop always continue to iterate |
| $Valid_i$ | : Valid bit. True if this loop counter is active |

Definitions:

Without loss of generality it is assumed that, if loop $\boldsymbol{j}$ is inner to (nested in) loop $\boldsymbol{i}$ then it is assigned with indices such that $\boldsymbol{j} > \boldsymbol{i}$ PC at End Instruction of loop $\boldsymbol{i}$ $$\boldsymbol{e}_i = Valid_i \wedge (\boldsymbol{PC} == \boldsymbol{EndAddr}_i)$$

LC Last iteration condition $$\boldsymbol{l}_i = Valid_i \wedge \overline{\boldsymbol{Inf}_i} \wedge (LoopCounterState_i == \boldsymbol{Count}_i - 1)$$

Advance bit of $LC_i$ $$\boldsymbol{a}_i = \boldsymbol{e}_i \wedge \overline{\boldsymbol{l}_i} \wedge \wedge_{j=i+1}^{M-1} (\overline{\boldsymbol{e}_j} \vee \boldsymbol{l}_j)$$

hence $\Sigma\, \boldsymbol{a}_i \leq 1$

Reset bit of $LC_i$ $$\boldsymbol{r}_i = \boldsymbol{e}_i \wedge \boldsymbol{l}_i \wedge \wedge_{j=i+1}^{M-1} (\overline{\boldsymbol{e}_j} \vee \boldsymbol{l}_j)$$

FIG. 20A

```
PC Definition: at each cycle, update the PC
        if (∃a_i s.t. a_i == 1)     // does not depend on any of the r_i -s
              PC = BeginAddr_i
        else
              PC ++
        end

LC Definition: at each cycle, update each loop counter:
        if Inf_i ∨ ¬Valid_i        // LC_i is inactive or infinite
              // keep original state
        else if (r_i == 1)
              LoopCounterState_i = 0          // reset
        else if (a_i == 1)
              LoopCounterState_i ++           // advance
        Else
              // keep current state
        end

LC Summary: Six cases:
  loop is inactive or infinite → keep LC state
  loop is not on its EndAddr → do nothing
  loop is on its EndAddr → advance, reset, or do nothing
```

FIG. 20B

2106

$$\boldsymbol{l}_i = (\boldsymbol{LC}_i == \boldsymbol{N}_i - 1) \quad \text{// Loop } LC_i \text{ Last iteration}$$

$$\boldsymbol{a}_i = \bar{l}_i \cdot \bigcap_{j=i+1}^{M-1} l_j$$

$$\boldsymbol{r}_i = \bigcap_{j=i}^{M-1} l_j$$

All loop counters $LC_i$ are then updated by

```
parfor i=0:M-1              // parallel update
    if (r_i == 1)           // reset
        LC_i = 0
    else if (a_i == 1)      // advance
        LC_i ++
    else                    // do nothing
    end
end
```

The PC updates by

```
if (∃a_i s.t. a_i == 1)
    PC = BeginAddr_i
else
    PC ++
end
```

FIG. 21B

2302

```
for (i = 0, i < M, i++)
  for (i = 0, i < N, i++)
      A;
  B;
  for (k = 0, k < K, k++)
      C;
  D;
}
E;
```

2304

```
PC    for (i = 0, i < M, i++) {
0          reconfigLoop(i,N,1,1);
           for (i = 0, i < N, i++)
1                A;
2          B;
3          reconfigLoop(i,K,4,4);
           for (i = 0, i < K, i++)
4                C;
5          D;
      }
6     E;
```

FIG. 23

CHIPS SUPPORTING CONSTANT TIME PROGRAM CONTROL OF NESTED LOOPS

STATEMENT REGARDING FEDERALLY SPONSORED RESEARCH OR DEVELOPMENT

This invention was made with Government support under Contract No. FA8750-18-C-0015 awarded by the U.S. Air Force, Office of Scientific Research. The Government has certain rights to this invention.

BACKGROUND

Embodiments of the present disclosure relate to neural network processing, and more specifically, to a constant time program control of nested loops.

BRIEF SUMMARY

According to embodiments of the present disclosure, chips for computing neural activations are provided. In various embodiments, a chip comprises at least one arithmetic-logic computing unit and a controller operatively coupled to the at least one arithmetic-logic computing unit. The controller is configured according to a program configuration, the program configuration comprising at least one inner loop and at least one outer loop. The controller is configured to cause the at least one arithmetic computing unit to execute a plurality of operations according to the program configuration. The controller is configured to maintain at least a first loop counter and a second loop counter, the first loop counter configured to count a number of executed iterations of the at least one outer loop, and the second loop counter configured to count a number of executed iterations of the at least one inner loop. The controller is configured to provide a first indication of whether the first loop counter corresponds to a last iteration and a second indication of whether the second loop counter corresponds to a last iteration. The controller is configured to alternatively increment, reset, or maintain each of the first and second loop counters according to the first and second indications.

According to embodiments of the present disclosure, methods of and computer program products for constant time program control of nested loops are provided. In various embodiments, a controller is configured according to a program configuration, the program configuration comprising at least one inner loop and at least one outer loop. At least one arithmetic computing unit executes a plurality of operations according to the program configuration. The controller maintains at least a first loop counter and a second loop counter, the first loop counter configured to count a number of executed iterations of the at least one outer loop, and the second loop counter configured to count a number of executed iterations of the at least one inner loop. The controller provides a first indication of whether the first loop counter corresponds to a last iteration and a second indication of whether the second loop counter corresponds to a last iteration. The second loop counter is alternatively incremented, reset, or maintained according to the first and second indications.

BRIEF DESCRIPTION OF THE SEVERAL VIEWS OF THE DRAWINGS

FIG. 6 illustrates another exemplary loop, according to embodiments of the present disclosure.

FIG. 7 illustrates an exemplary nested loop, according to embodiments of the present disclosure.

FIG. 8 illustrates exemplary loop testing conditions according to embodiments of the present disclosure.

FIG. 11 illustrates an exemplary static loop unrolling technique according to embodiments of the disclosure.

FIG. 12 illustrates an exemplary loop merging technique according to embodiments of the disclosure.

FIG. 13 illustrates an exemplary loop counter according to embodiments of the disclosure.

FIGS. 15A-B illustrate another exemplary parallel loop counter according to embodiments of the disclosure.

FIGS. 18A-B illustrate an exemplary parallel loop, nested, counter according to embodiments of the disclosure.

FIGS. 20A-B illustrate an exemplary loop counter definition according to embodiments of the disclosure.

FIGS. 21A-B illustrate an exemplary parallel loop, without program counter, according to embodiments of the disclosure.

FIG. 23 illustrates an exemplary loop reconfiguration according to embodiments of the disclosure.

DETAILED DESCRIPTION

Figure 1:
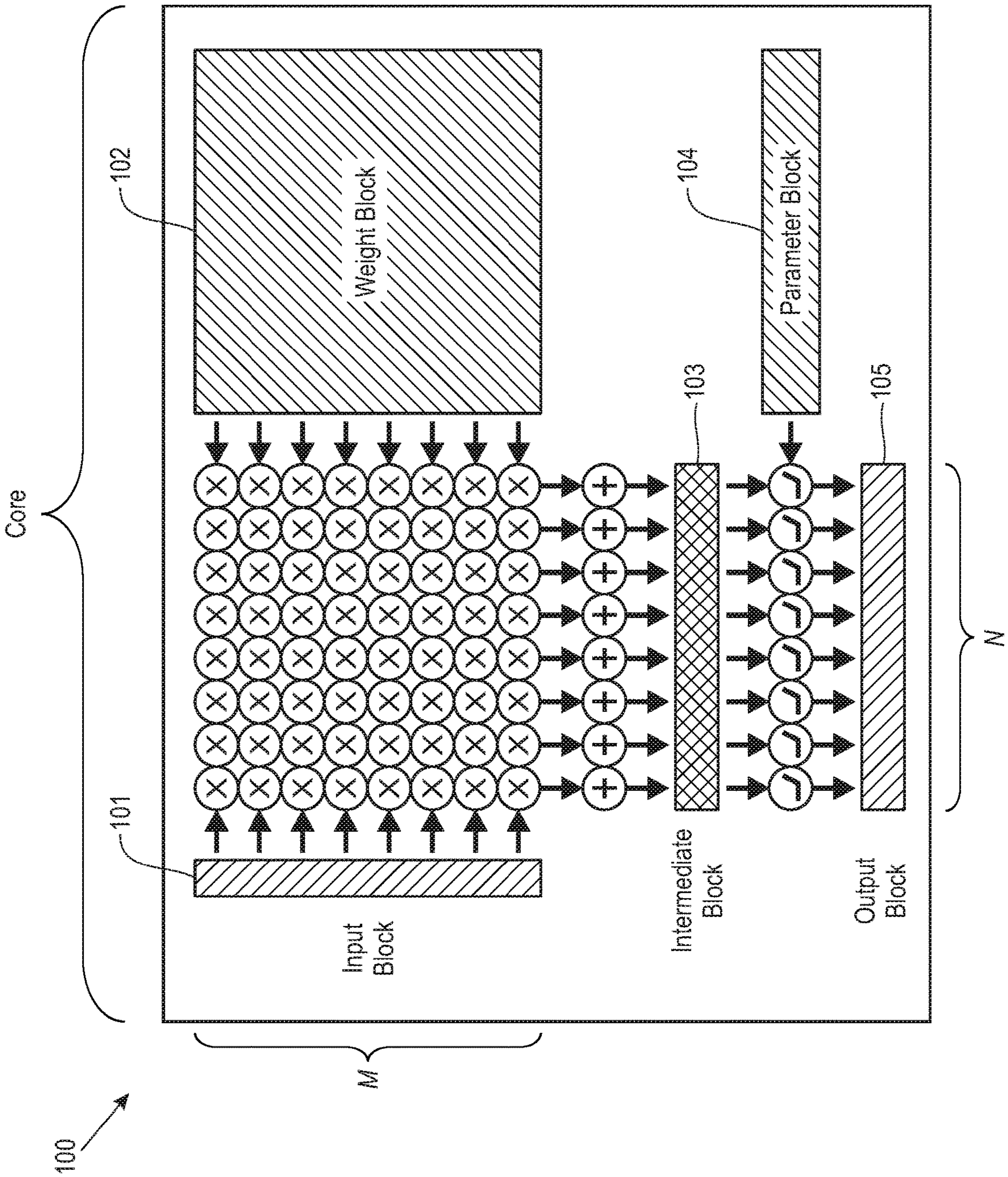
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ. In some embodiments, activation function σ requires no additional parameters, in which case the additional dimension is unnecessary. However, in some embodiments, activation function σ requires at least one additional parameter, which appears in dimension o.

An element of a layer's output data tensor Y can be computed as in Equation 1 where the neuron activation function σ is configured by the vector of activation function parameters V[i,j,k,:], and the weighted sum Z[i,j,k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i,j,k]=σ(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, y E Y based on the inputs and weights W with elements $w_i$. In various embodiments, the weighed sum of inputs is adjusted by a bias b, and then the result is passed to a nonlinearity F(•). For example, a single neuron activation may be expressed as $y=F(b+\Sigma x_i w_i)$.

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
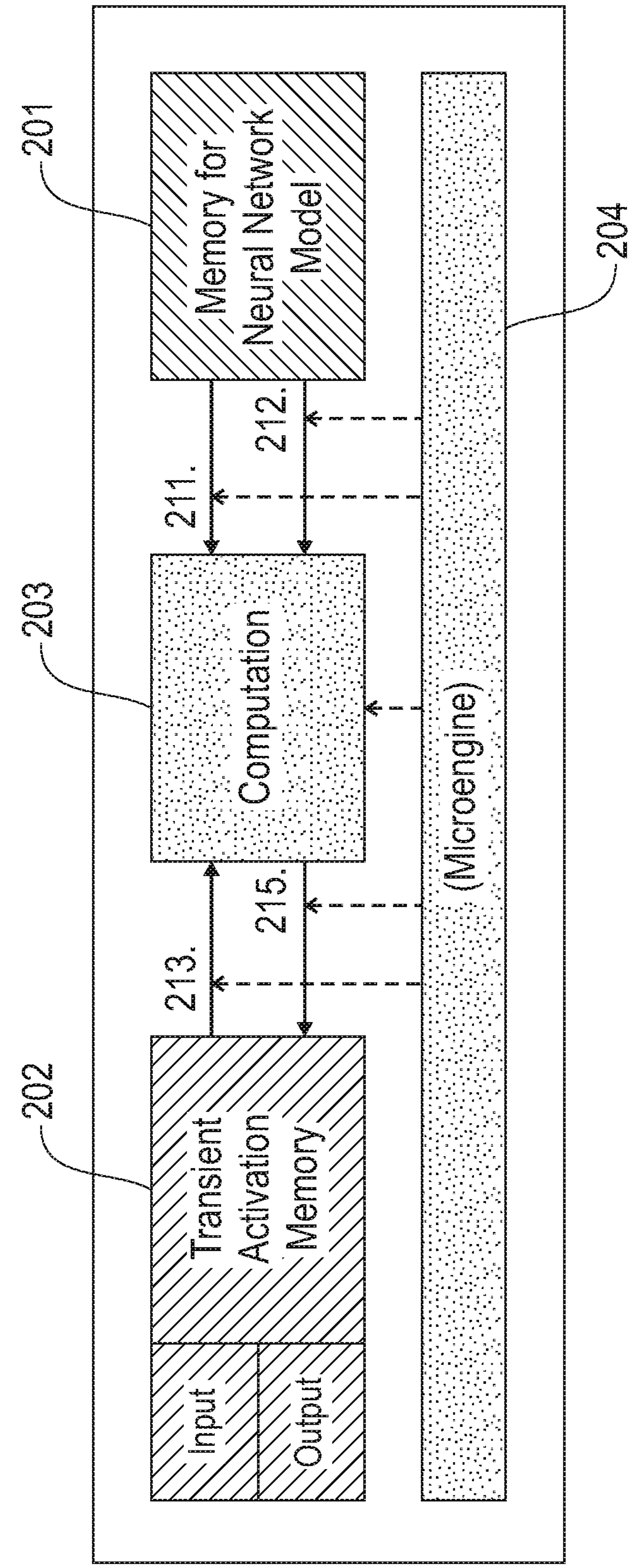
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
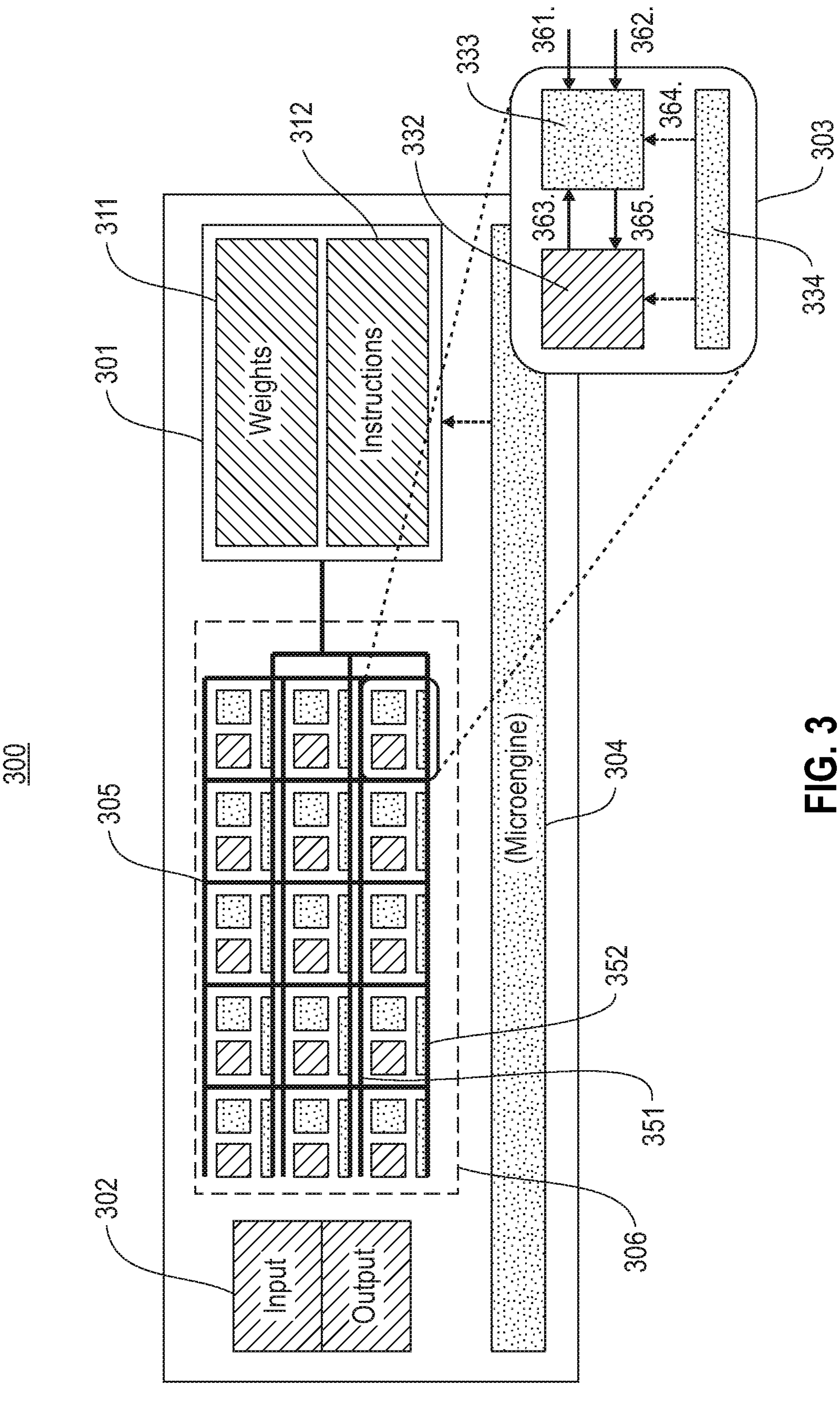
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the global microengine (chip microengine) and the local core controller (core microengine) collaboratively direct operations. In particular, at 361, compute instructions are loaded from instruction portion 312 of model memory 301 to the core controller 334 on each core 303 by global microengine 304. At 362, parameters (e.g., neural network/synaptic weights) are loaded from weight portion 311 of model memory 301 to the neural computation unit 333 on each core 303 by global microengine 304. At 363, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 364, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 365, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) Core microcode is run on the core microengines (e.g., 334). In the case of local computation, the core microcode includes instruction(s) to execute a full, single tensor operation. For example, a convolution between a weight tensor and a data tensor. In the case of distributed computation, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
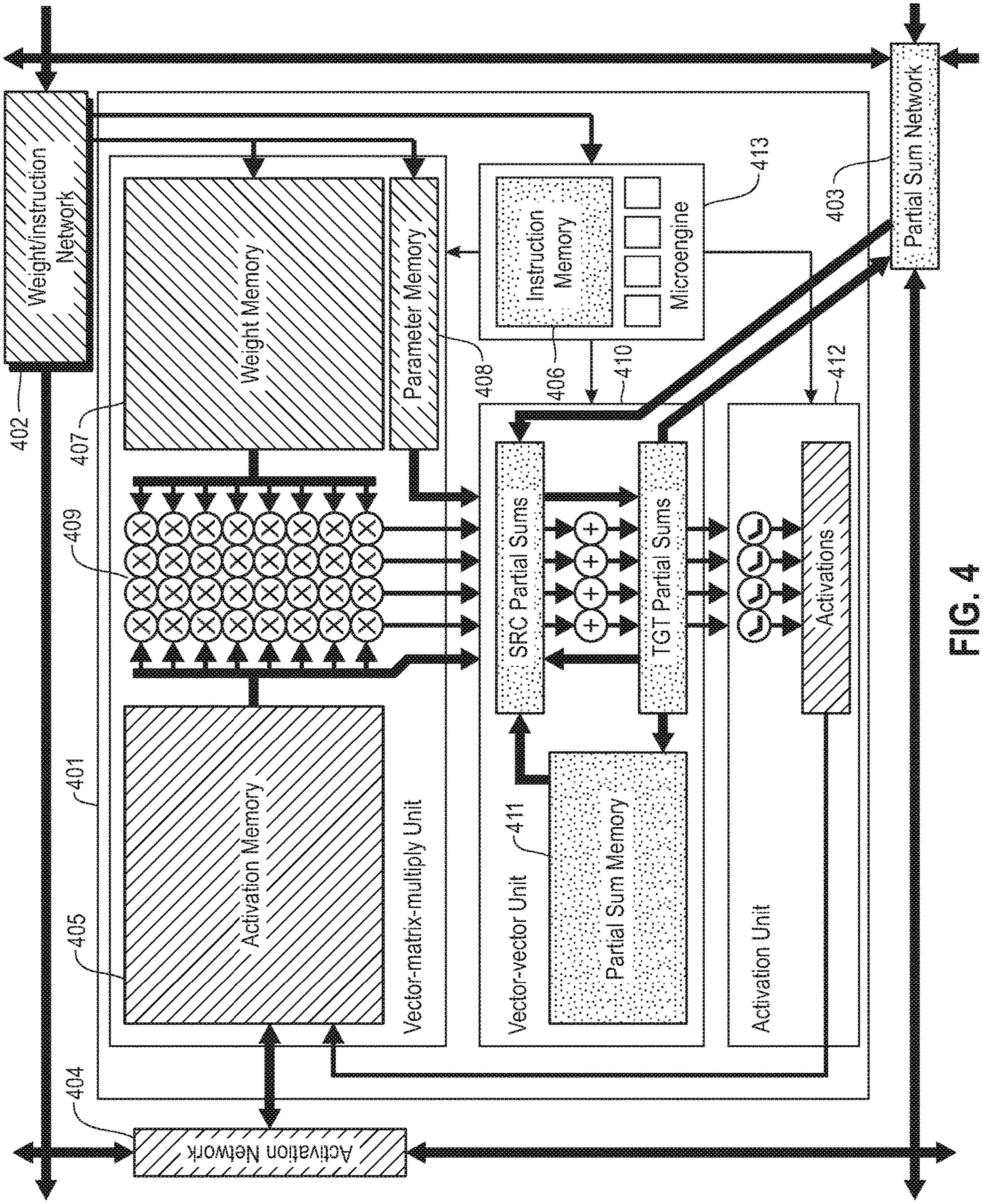
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 . . . 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (WM) unit 409. The activation vector (V) is read from activation memory 405 by Vector Matrix Multiply (WM) unit 409. Vector Matrix Multiply (WM) unit 409 then computes vector-matrix multiplication $Z=X^TW$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Accordingly, in operation, a core control microengine (e.g., 413) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, causing the vector-matrix multiply unit to compute a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 410 include Vector Matrix Multiply (VMM) unit 409, constants from parameter memory 408, partial sum memory 411, partial sum results from prior cycles (TGT partial sums); and partial sum network 403.

Targets for vector-vector unit 410 include partial sum memory 411, partial sum results for subsequent cycles (SRC partial sums), activation unit 412, and partial sum network 403.

Accordingly, a given instruction may read or write from activation memory 405, read from weight memory 407, or read or write from partial sum memory 411. Compute operations performed by the core include vector matrix multiplication by VMM unit 409, vector (partial sum) operations by vector-vector unit 410, and activation functions by activation unit 412.

Control operations include updating program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters in microengines.

It will be appreciated that to accommodate various program constructs, it is advantageous to provide a microengine capable of efficient program control of nested loops. Accordingly, the following discussion provides various exemplary embodiments of a suitable microengine.

Figure 5:
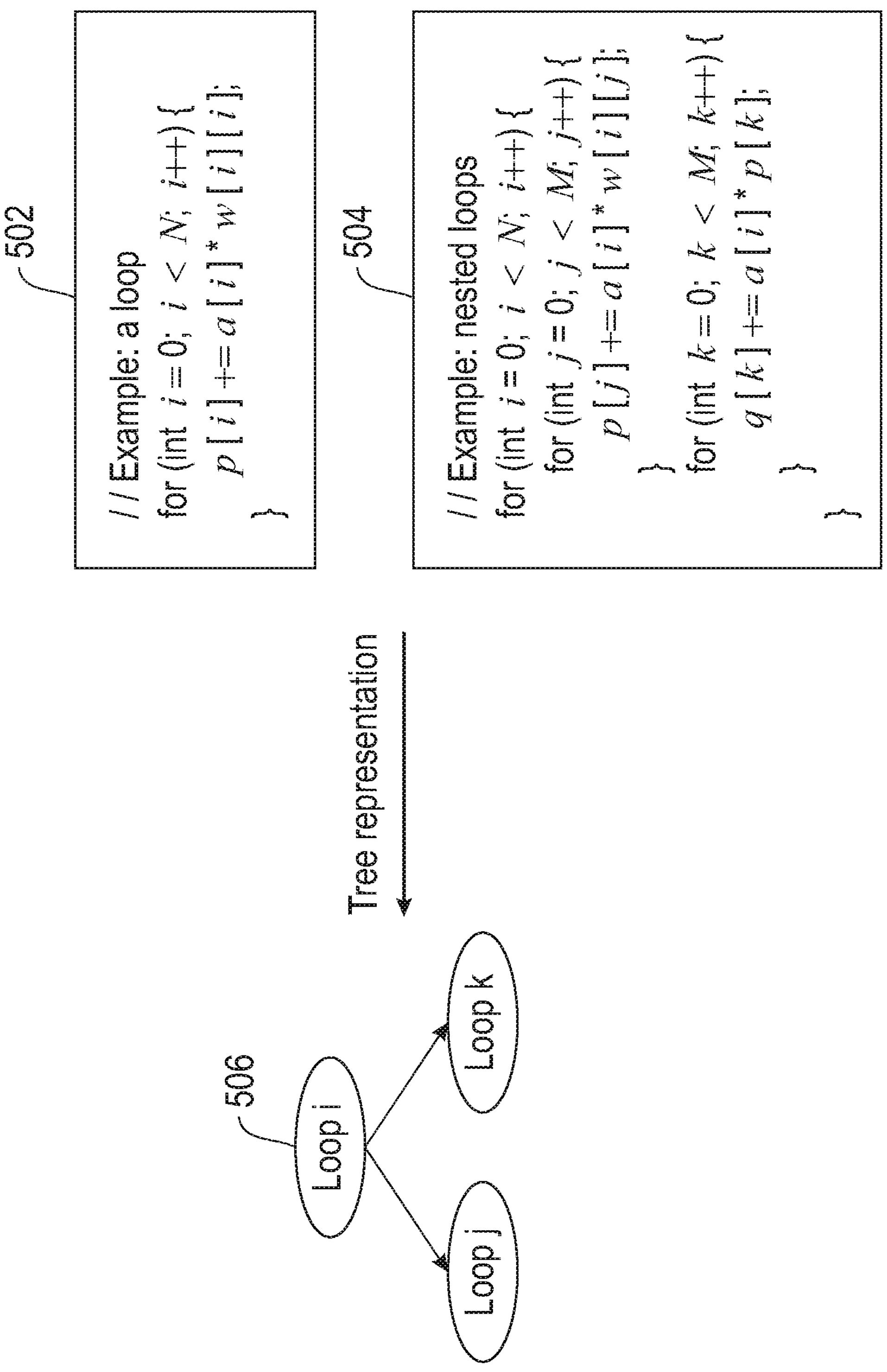
FIG. 5 illustrates an exemplary loop, and nested loop, according to embodiments of the present disclosure.

Referring now to FIG. 5, an exemplary loop 502 is provided, which is a program control construct that can repeat the execution of set of instructions (also referred to as the loop's "body") a number of times (or "iterations"). Also shown in FIG. 5 is an exemplary nested loop 504, e.g., when a (inner) loop is enclosed in another (outer) loop. In some embodiments nested loops can be represented as a tree 506, where each loop ("Loop j" and "Loop k") is a node and its parent ("Loop i") is the innermost loop in which it is enclosed.

Loops are the core control construct of all modern computers and are a major part of nearly any algorithm. In particular, machine learning applications and Deep Convolutional Neural Networks require the execution of a huge number of arithmetic operations. These are controlled by complex code structure, containing many nested loops (in some embodiments loop nesting can be 10-16 loops deep). The overhead of the looping itself is paramount. In fact, it might take many more computation cycles than the actual arithmetic it drives, therefore dramatically reducing the arithmetic processing utilization, increasing power and reducing performance. For example, in SIMD architecture, where utilization is a critical factor, each lost cycle on program control translates to a significant loss of computation since the loss is multiplied by the number of parallel SIMD operations/cycle. Consequently, there is a need for very efficient loop control methods and systems for Central Processing Units (CPU-s) and other processing units including Graphical Processing Units (GPU-s), Field Programmable Gate Arrays (FPGA-s) and other specialized processors—a need addressed by the subject matter disclosed herein. In some embodiments, the disclosed system can be used in a variety of processors and controllers, including but not limited to CPU, GPU, FPGA, neuromorphic processors, convolution processing units, inference engines, tensor processing units, etc.

Loops can be implemented in software using a conditional branch, examples are presented in FIG. 6, where the loop index, or loop iterator, is denoted by "i". An exemplary loop is shown in code block 602, and an exemplary conditional branch is shown in code block 604. When loops are nested, as shown in code block 702, the evaluation of the termination conditions can become serialized. In examples depicted in FIG. 7, whenever "L2" ends, "I" is incremented and the condition for "L1" is evaluated, as shown in code block 704. Hence, each evaluation of the loop body is preceded by the evaluation of one or two loop conditions. In accordance with an aspect of the present disclosure, utilization can denote the ratio between the number of cycles used to process the body instructions, and the total number of cycles (including loop initialization and branching). In general, the more nested loops are used, the more conditions need to be evaluated, reducing the utilization. In some embodiments, the conditions implemented within a loop can be tested before, or after, the loop body. Examples of this are depicted in FIG. 8 where a loop repeats until its termination condition is met, and the termination must be evaluated either before or after each iteration, as shown in code block 802. If the termination condition is checked before the body is executed, the loop may be performed 0 or more times. If the termination condition is checked after the body is executed, the loop may be performed 1 or more times, as shown in code block 804.

Figure 9:
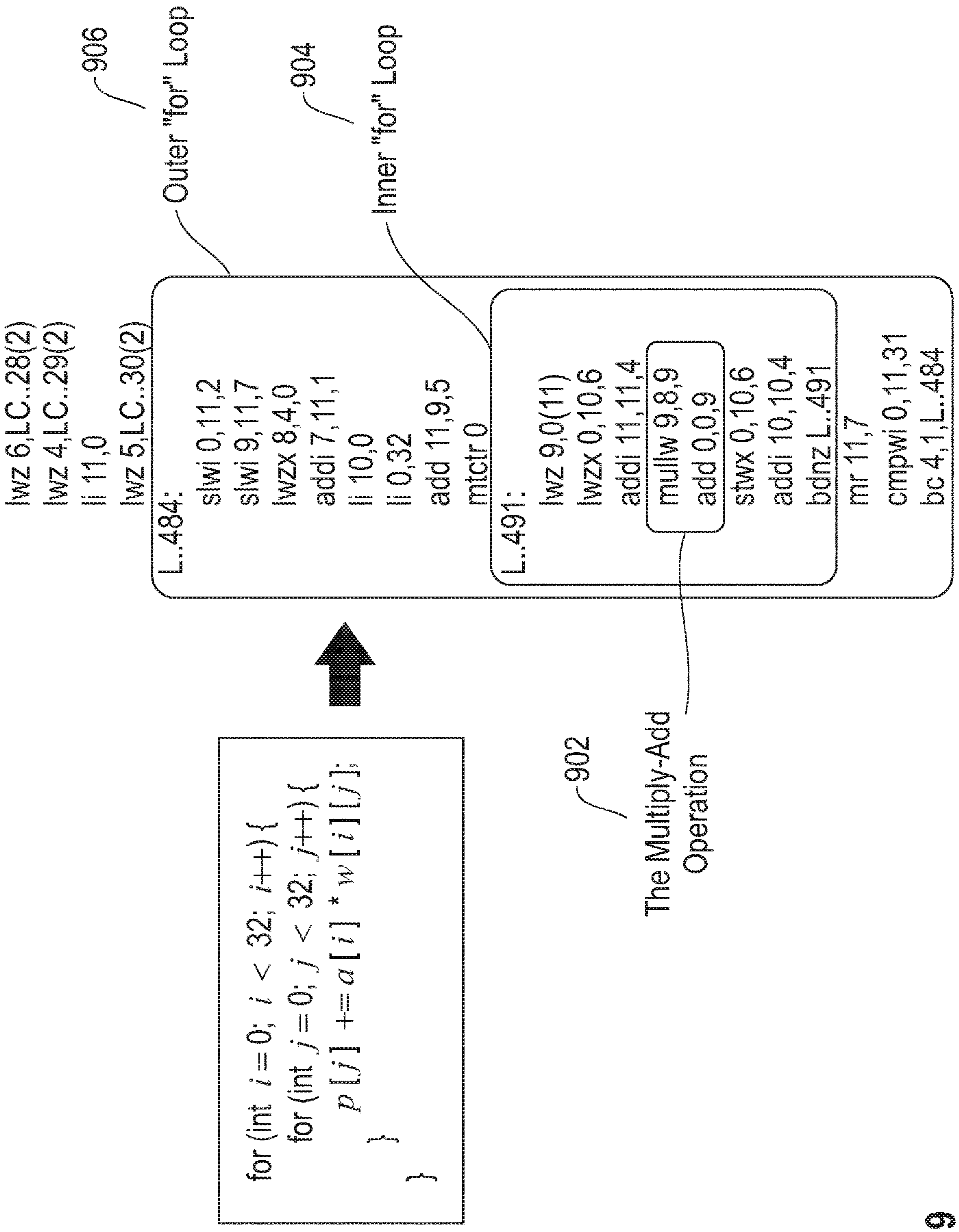
FIG. 9 illustrates exemplary CPU loop instructions according to embodiments of the present disclosure.
Figure 10:
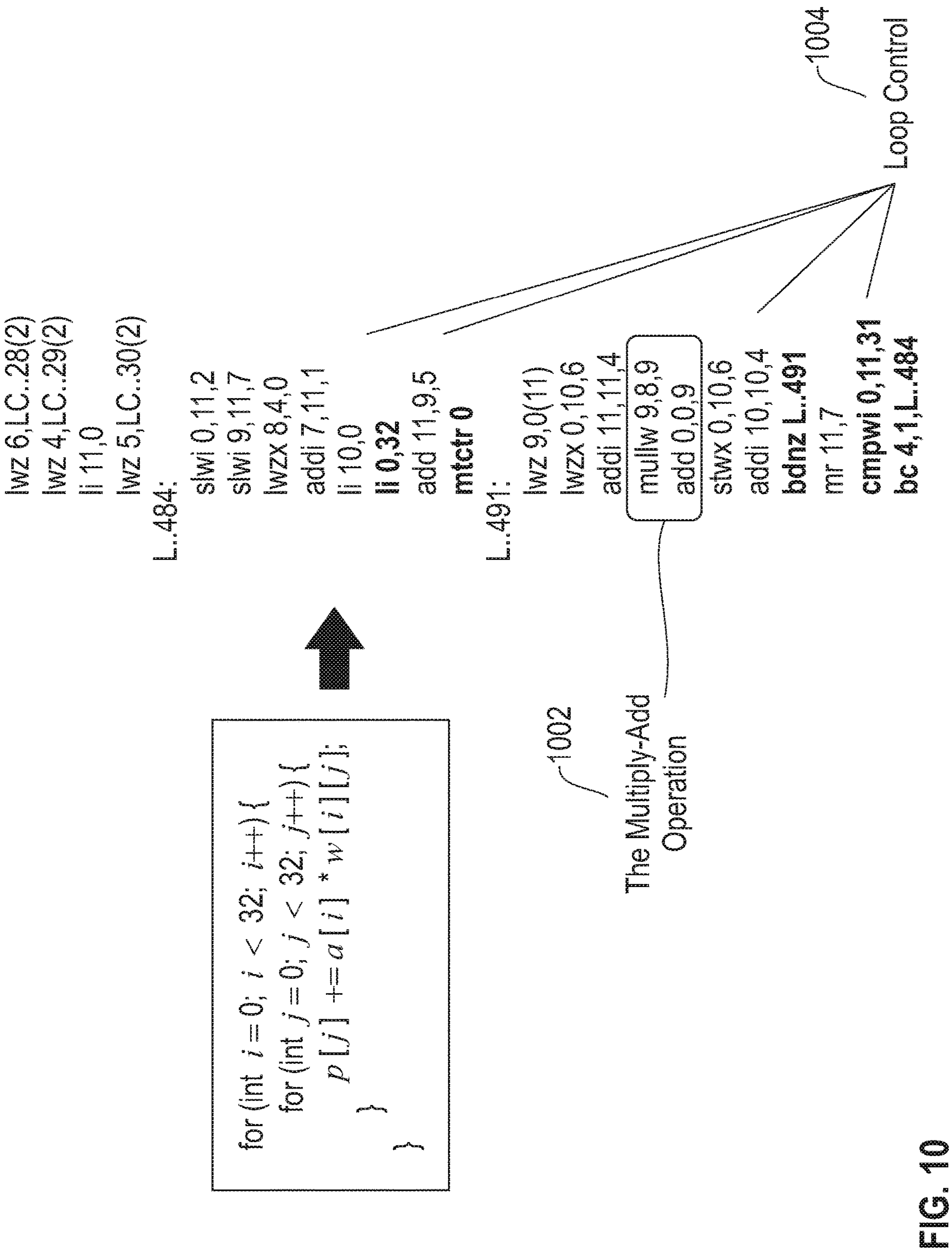
FIG. 10 illustrates exemplary CPU loop instructions according to embodiments of the present disclosure.

FIG. 9 depicts an exemplary set of CPU loop instructions, compiled to an assembly code (e.g. using a POWER processor by IBM), including an outer "for" loop 906, an inner "for" loop 904 and a multiply-add operation 902. Updating a loop counter and checking the loop condition takes one or more cycles, and checking conditions of multiple nested loops is sequential, from the innermost loop outwards. Accordingly, the more loops are nested, the more time it takes to update the loops, thereby reducing utilization. FIG. 10 depicts another exemplary set of CPU loop instructions, with the multiply-add operation 1002, and the loop control 1004 highlighted in bold font.

FIG. 11 depicts an exemplary static loop unrolling technique, wherein the programmer analyzes the loop to interpret the iterations into a sequence of instructions in order to reduce the loop overhead. This approach is in contrast to dynamic unrolling, which is performed by the compiler. The example shown deletes 100 items from a collection, which can be accomplished using a "for" loop, which calls the function "delete(ietm_number)". Where the overhead of the loop requires significant resources compared to those for the "delete(x)" loop, unwinding (or unrolling) can be employed to a select portion of the program for faster optimization, as shown. However, loop unrolling has some disadvantages including increased program code size (which is exacerbated and increased further if the loop body includes a function call, especially if inlined). Also, unrolling can cause an increase in instruction cache misses, which may adversely affect performance; and unless performed transparently by an optimizing compiler, the code may become less readable. Apart from very small and simple codes, unrolled loops that contain branches are typically slower. Thus, when using Very Large Instruction Word architecture, unrolling can require additional program cache and/or program memory.

FIG. 12 depicts an exemplary loop merging technique, where two (or more) nested loops, as shown in code block 1202, are replaced with one loop, as shown in code block 1204, that performs the same total number of iterations. An advantage of this approach is it requires less overhead from loops. At each iteration a test is conducted and advanced one index, instead of testing one or two conditions and applying one or two index updates. On the other hand, a disadvantage of this approach is that computing indices based on the combined loop index can become more complicated and may require modular arithmetic. This becomes more complicated when the number of merged loops increases. Some hardware solutions, including some CPU-s (e.g. Intel 8086 microprocessors), have operation codes for implementing a loop counter using a dedicated register/counter which reduces the number of operations (or OPs) to one. However, these are only applicable to a single loop; consequently nested loops need to use other registers, with general operations. Indeed, even for a single loop, it can still take one or two cycles to iterate—thus the overhead is not zero. FIG. 13 depicts exemplary 8086 microprocessor instruction set reference.

In accordance with an aspect of the present disclosure, a configurable loop control circuit is provided, where the circuit is first configured and then run. The configuration of a loop can include the number of iterations, the begin program counter address and end program counter address of the loop body code block. Such a configurable loop control circuit can support a large number of nested loops, with an exemplary embodiment including a circuit supporting 16 nested loops. The circuit can check all nested loop conditions in parallel: with a loop condition checking circuit automatically triggered (e.g. without a LOOP OP or a branch in the code) and all loop condition checks and counters updates performed to all loops in a single clock cycle. This can be performed while the last instruction in the loop body is being executed (hence incurring zero overhead).

Figure 14:
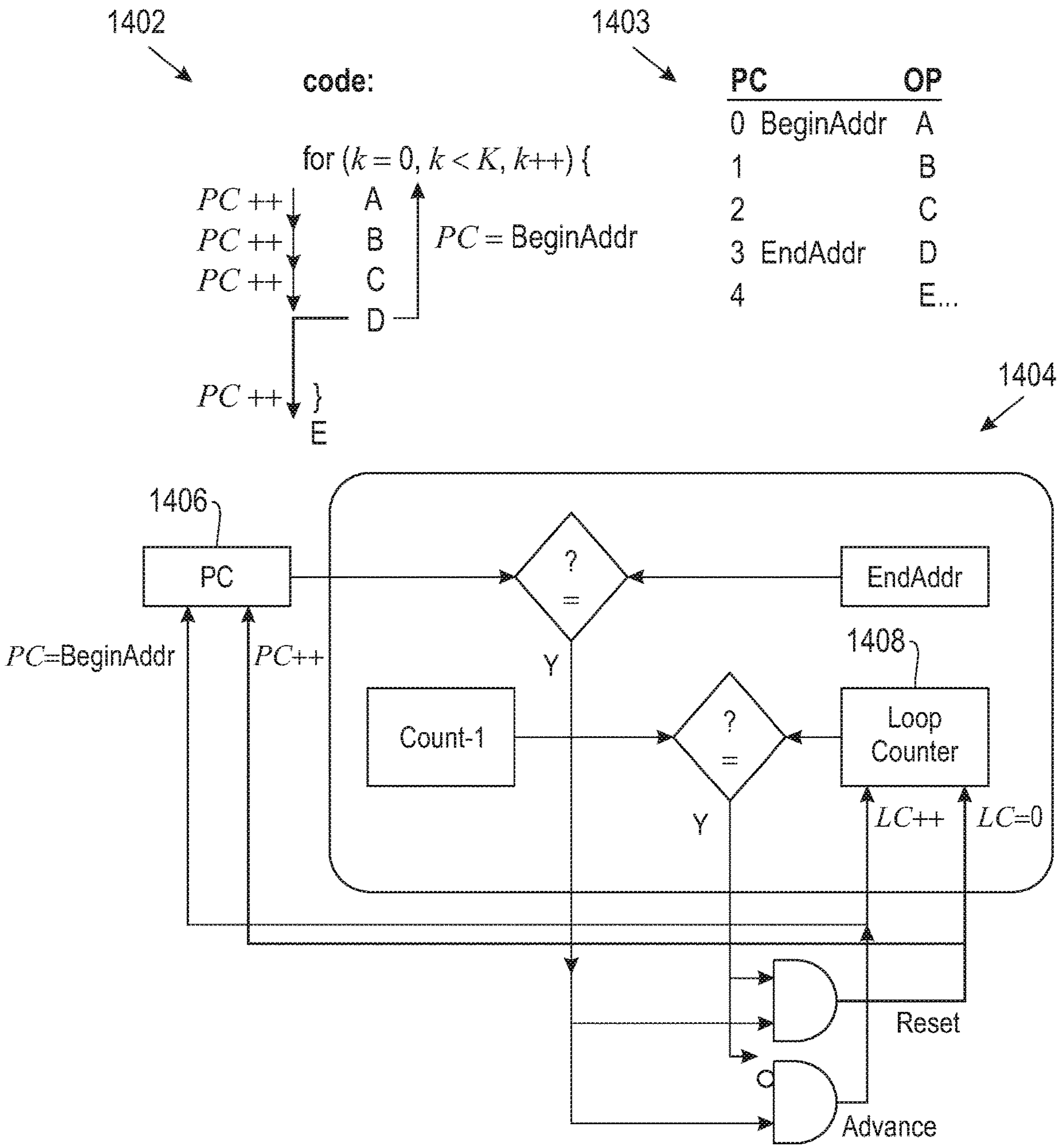
FIG. 14 illustrates an exemplary parallel loop counter according to embodiments of the disclosure.
Figure 15A:
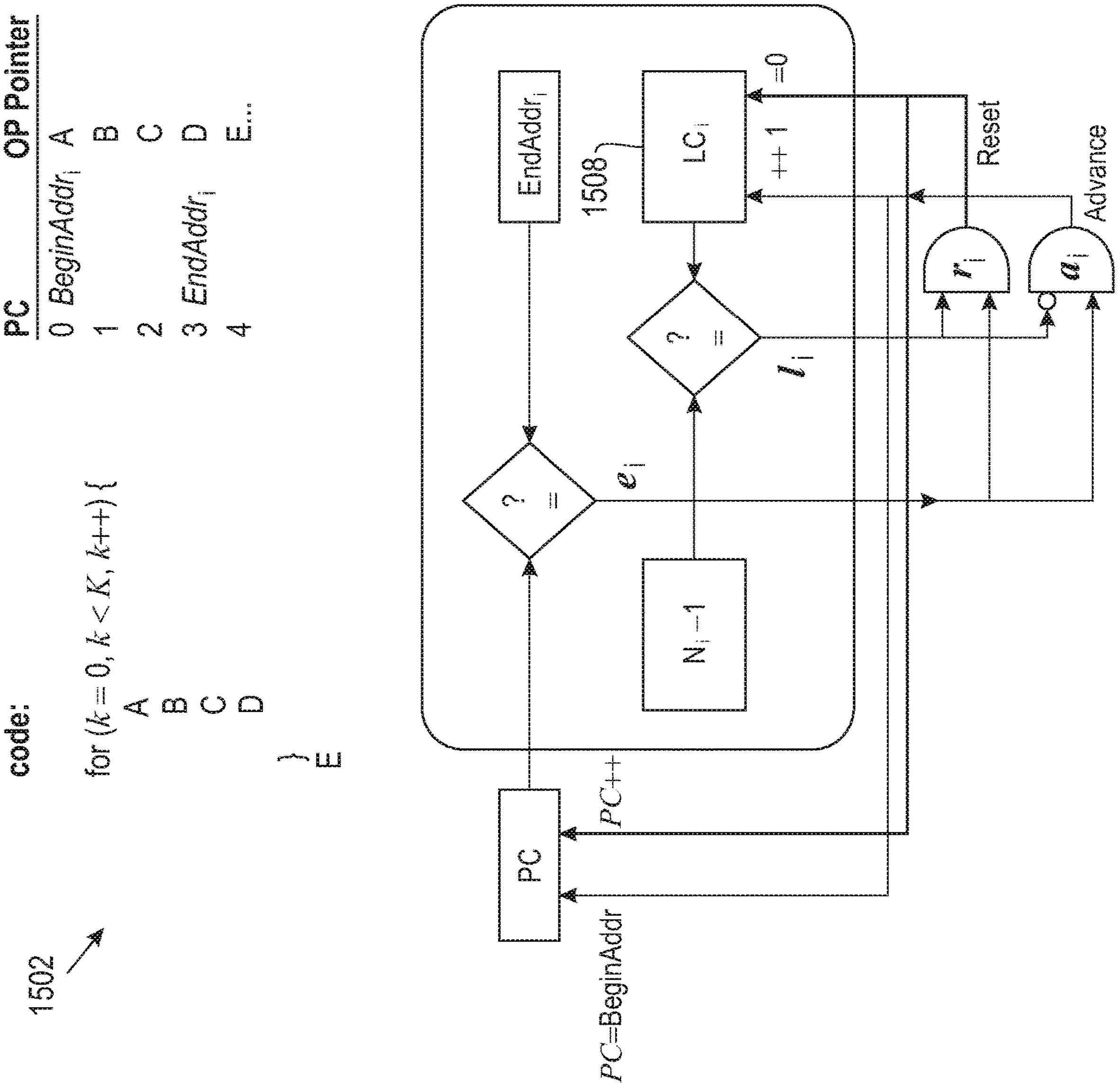

FIGS. 14-15 depict an exemplary embodiment of parallel loops in hardware, employing a single loop counter, in accordance with the present disclosure. As shown, code block 1402 and circuitry 1404 can be incorporated in a system with a Program Counter (PC) 1406 and a single loop counter 1408, is implemented in hardware where a first step includes configuring the loop counter circuit as:

LoopCounter(BeginAddr, EndAddr, Count)

For each cycle, the instruction pointed by the PC 1406 is executed, and the PC can be updated between cycles, with its update dependent on the loop counter state. In the embodiment shown in block 1403, "BeginAddr" and "EndAddr" are the PC values of the first and last instruction in the loop body, respectively, and Count is the number of iterations. The loop circuit receives the PC value 1406, controls the loop counter 1408, and controls the PC. At each cycle, the LC may Advance, Reset or do nothing. If the PC is not equal to EndAddress, the LC does nothing. If the PC is equal to EndAddress, then it compares the current value of LC to N−1 (the value of Count−1 in this example). If they are equal, LC will reset and the PC will advance by 1. If they are not equal, LC will advance by 1 and the PC will be set to BeginAddr. FIG. 15 shows expressions 1505 that are used to describe a single loop counter 1508 behavior at each cycle. This principled behavior can be modified for the case of nested loops as described in further detail herein.

Figure 16:
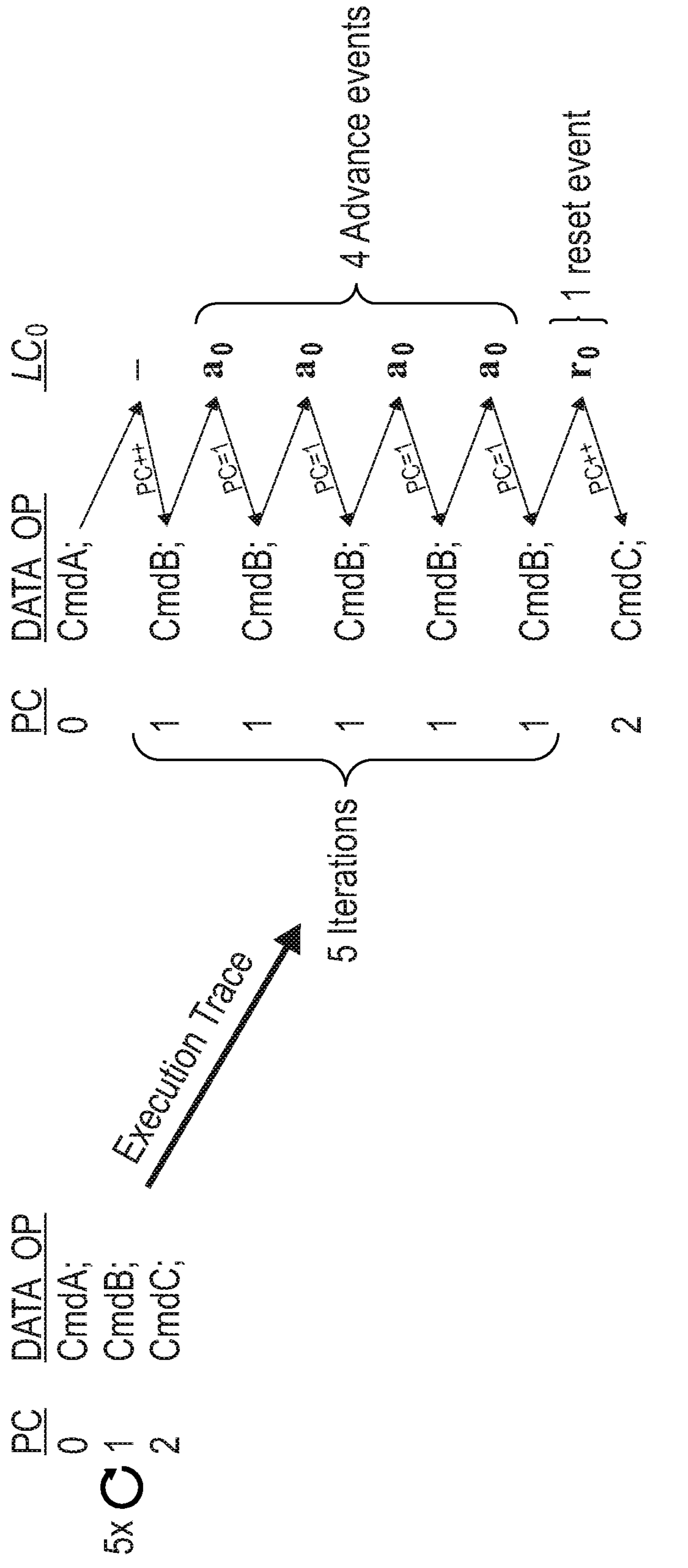
FIG. 16 illustrates an exemplary loop trace according to embodiments of the disclosure.

FIG. 16 depicts an exemplary embodiment of a loop trace, in accordance with the disclosed subject matter. The illustrated example aims to execute CmdA, then CmdB five (5) times, and then CmdC, as shown. The loop counter circuit is configured as:

$$LC_0=\langle BeginAddr_0=1, EndAddr_0=1, Count_0=5\rangle$$

As shown in the cycle by cycle trace, first it executes CmdA, then the PC advances to 1. The PC stays at 1 for another 4 cycles, executing CmdB 4 more times while the LC is advanced 4 times. After the fifth iteration the LC is reset to 0 and the PC advances to 2, and executes CmdC.

Figure 17:
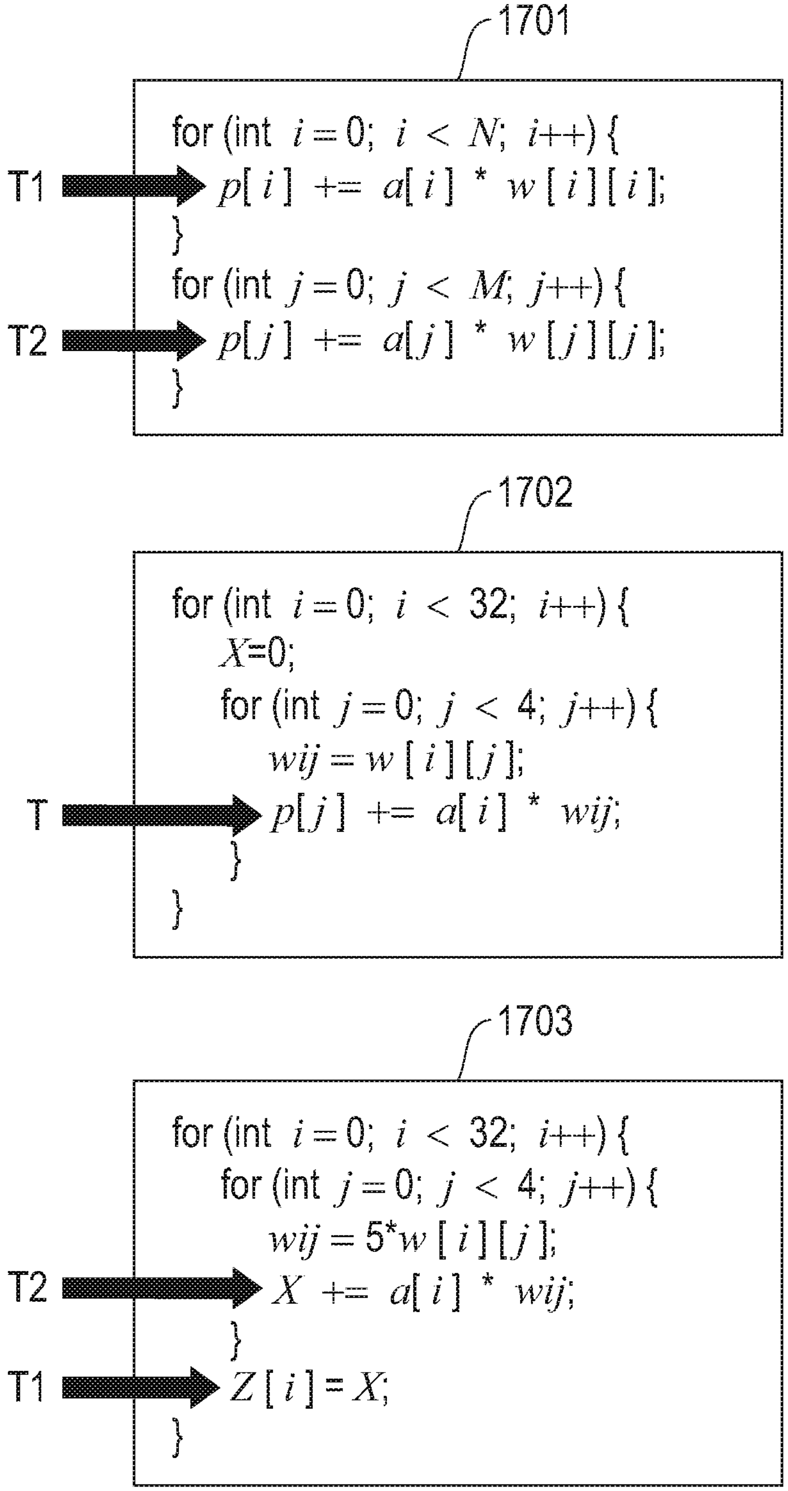
FIG. 17 illustrates another exemplary multiple loop counter according to embodiments of the disclosure.

FIG. 17 depicts an exemplary embodiment of the present disclosure expanded to multiple loop counters. When two or more loops are present in a program, the interaction between two loop counters can be classified into three cases 1701, 1702 and 1703 as depicted and described below:

1. Disjoint loops (1701): When the two loops are not nested, their evaluation is performed at different cycles (e.g. different PC values) and is therefore independent of each other. Each loop counter can be implemented by the same system as a single loop.
2. Co-ending nested loops (1702): one loop is nested within the other, and the last instruction of the nested loop body (T1=T) is also the last instruction of the outer loop body (T2=T). In this case, after performing the op at PC=T, one or more of the following can be performed: a) increase j, orb) reset j and increase i, or c) reset both i and j and exit from the nested loops. The number of possible alternative actions at instruction T increases with the number of co-ending nested loops.
3. Non co-ending nested loops (1703): one loop is nested within the other, and the outer loop body contains at least one more instruction after the end of the body of the inner loop. Like disjoint loops, at each of T1, T2 there is only one loop counter that needs to be checked and updated.

Figure 18A:
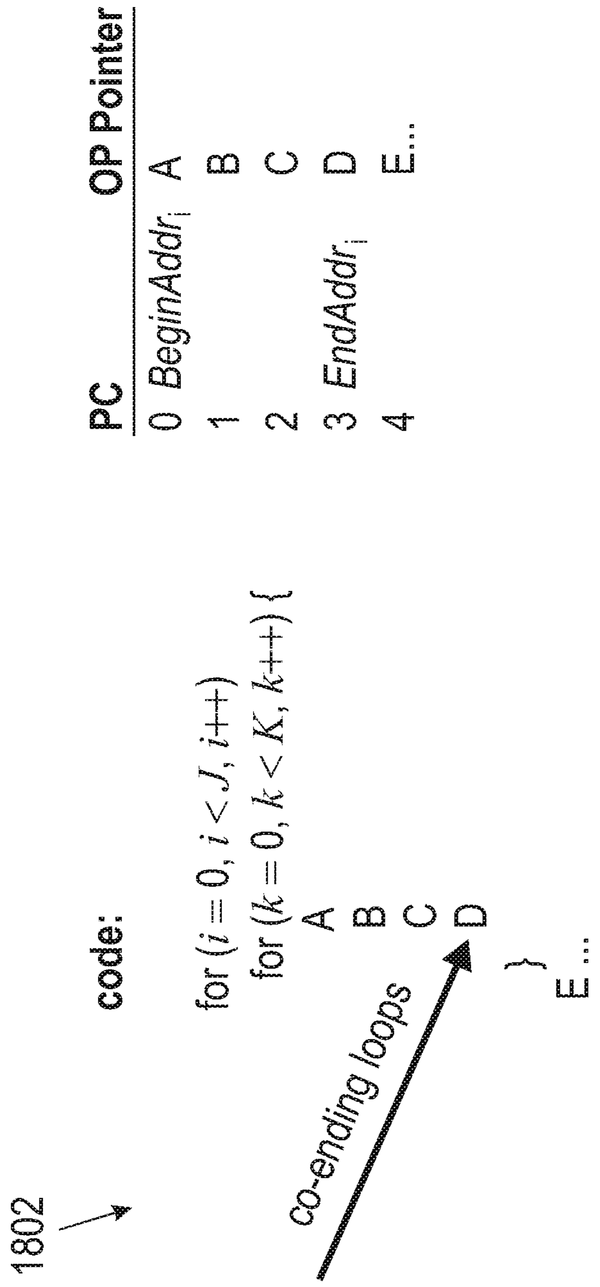
Figure 19A:
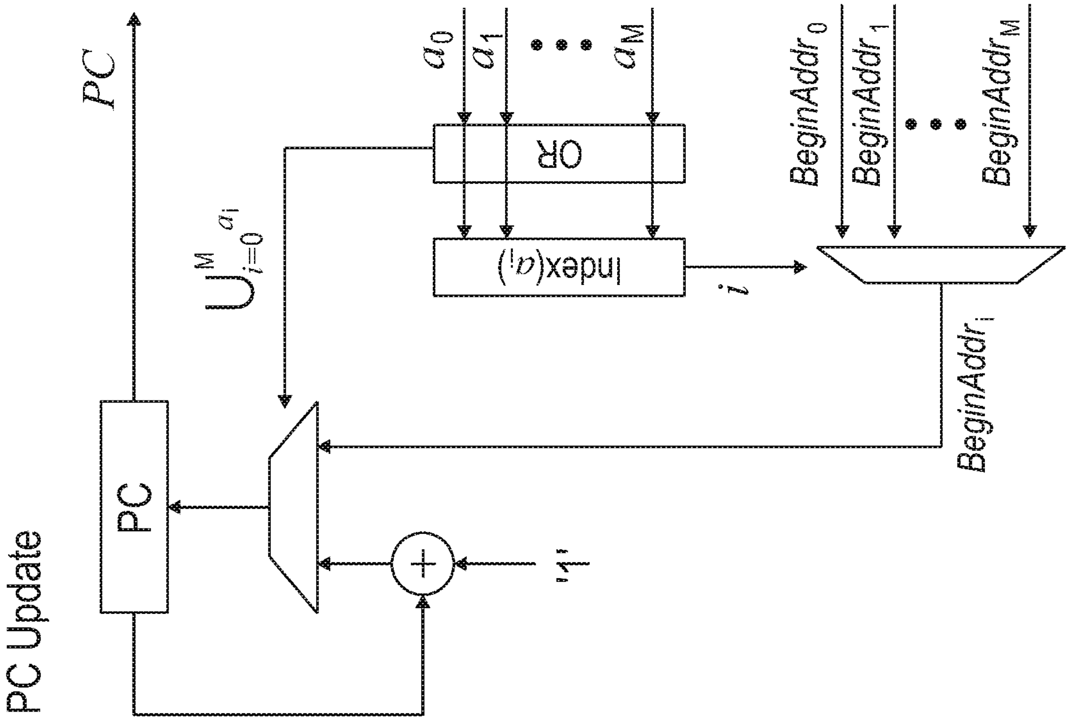
FIGS. 19A-B illustrate an exemplary program counter and loop counter according to embodiments of the disclosure.
Figure 19B:
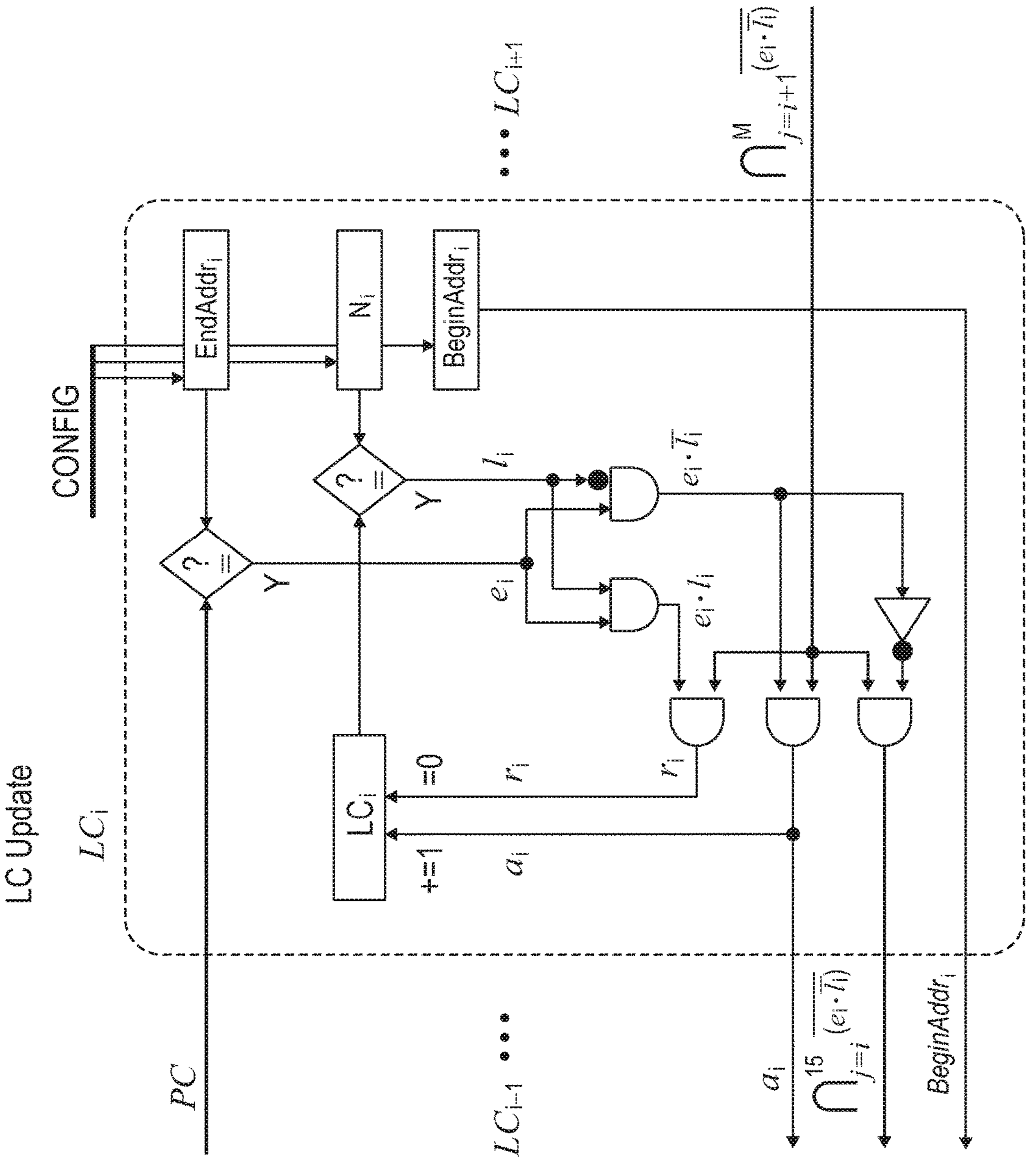

The circuit provided herein addresses all three cases. Furthermore, it applies to any number of loops, configured in arbitrary combinations of these three cases, including any number of co-ending nested loops. FIG. 18 depicts an exemplary embodiment of the present disclosure for parallel loops in hardware, with nested, co-ending loop counters as shown in code blocks 1802 and 1805. Here, the system implement M Loop Counters, enumerated from 0 to M−1. It handles all three cases defined in FIG. 17, namely disjoint loops and nested loops (co-ending and non co-ending). Without loss of generality, it is assumed that if $LC_j$ and $LC_i$ are co-ending, and loop $LC_j$ is nested in loop $LC_i$ then j>i. An exemplary embodiment of the logic circuit, including program counter (PC) and Loop Counter (LC) diagrams, in accordance with the present disclosure is shown in FIG. 19. In block 1805, the values of $e_i$, $l_i$, and $t_i$ are computed independently, in parallel, for all loop counters from i=0 to M−1. Consequently, the values of a, and $r_i$ are computed for each of the loop counters, in parallel, by aggregating the $t_i$ from loop counters of higher indices (possibly inner loops). Finally, each of the loop counters is updated, as well as the PC, using the update rules in block 1805. These expressions are computed at each cycle. As a result the PC will have its new value for the next cycle, and each of the loop counters will keep its state, advance or reset. This computation is applicable to any configuration of the loop counters.

In an exemplary embodiment, a loop counter can run unconditionally forever, and is denoted as an infinite loop and indicated by a binary flag:

$Inf_i$: true if this loop always continue to iterate

Also, one or more LC-s can be inactive at some periods of time. This is indicated as an active loop counter by a valid bit $Valid_i$: Valid bit. True if this loop counter is active In accordance with an aspect of the disclosure, the loop counter circuit can be implemented in a variety of ways. For example, instead of defining a Valid bit, the value of Counter=0 can be designated to indicate that the loop counter is inactive. While the description is provided for loop counters starting from an initial value of zero, a reset value of zero, and an increment value of one, it should be clear to an artisan of ordinary skill that a loop counter configuration can be extended to additional fields. For purpose of illustration and not limitation, some examples include a specified initial value; application of a specified increment value; count upwardly or downwardly based on the sign of the step value and the termination criteria. If desired, these additions can also include an additional adder circuit and a signed comparator. In addition, error checking can be provided, and in some embodiments include additional circuits added to assert the validity of the configuration (such as initial value should be lower than Count) and act to restore to a defined operation mode (such as replacing the invalid initial value with zero) and/or generating an error signal.

FIG. 20 depicts an exemplary embodiment of a loop counter definition including the flags described above. As shown, the Loop Counter (LC) Definition includes Valid and Inf bits. Also in accordance with the present disclosure, Loop behavior for Finite and Infinite Loops can be as follows:

$$\text{Set } LC_i = \langle BeginAddr_i, EndAddr_i, Count_i, OneTimeInitialValue_i, Valid_i, Inf_i \rangle$$

For Finite Loop Counter Operation, it is executed $Count_i$ times. In particular,

- A Loop Counter with $Count_i=0$ is disabled
- A Loop Counter with $Count_i=1$ is executed once and never advances
- A Loop Counter with $Count_i>1$ is executed $Count_i$ times and advances $Count_i-1$ times For Infinite Loop Counter Operation, loop behavior is as follows:

- If $LC_1$ is set an infinite loop, then $l_i=0$ always (which means it never reaches its last iteration). Hence, it can never reset.
- When it needs to advance, it sets $\alpha_i=1$.
- However, even though $\alpha_i=1$ the infinite loop counter will not increment its count. It will always remain 0.

For An Infinite Loop Counter Usage, loop behavior is as follows:

- An infinite loop may be the exterior, outmost loop. Additionally or alternatively, it can co-end with inner loops, nested within it.
- By definition, since an infinite loop never resets, any co-ending loop outer to an infinite loop will never advance nor reset.
- An infinite loop is similar to a "goto". The simplest case is when it is not co-ending with any other loop. Then, whenever the PC reaches the $EndAddr_i$ it will jump to $BeginAddr_i$. When it does contain co-ending inner loops, the jump will only occur after all the inner loops have completed.

Figure 21A:
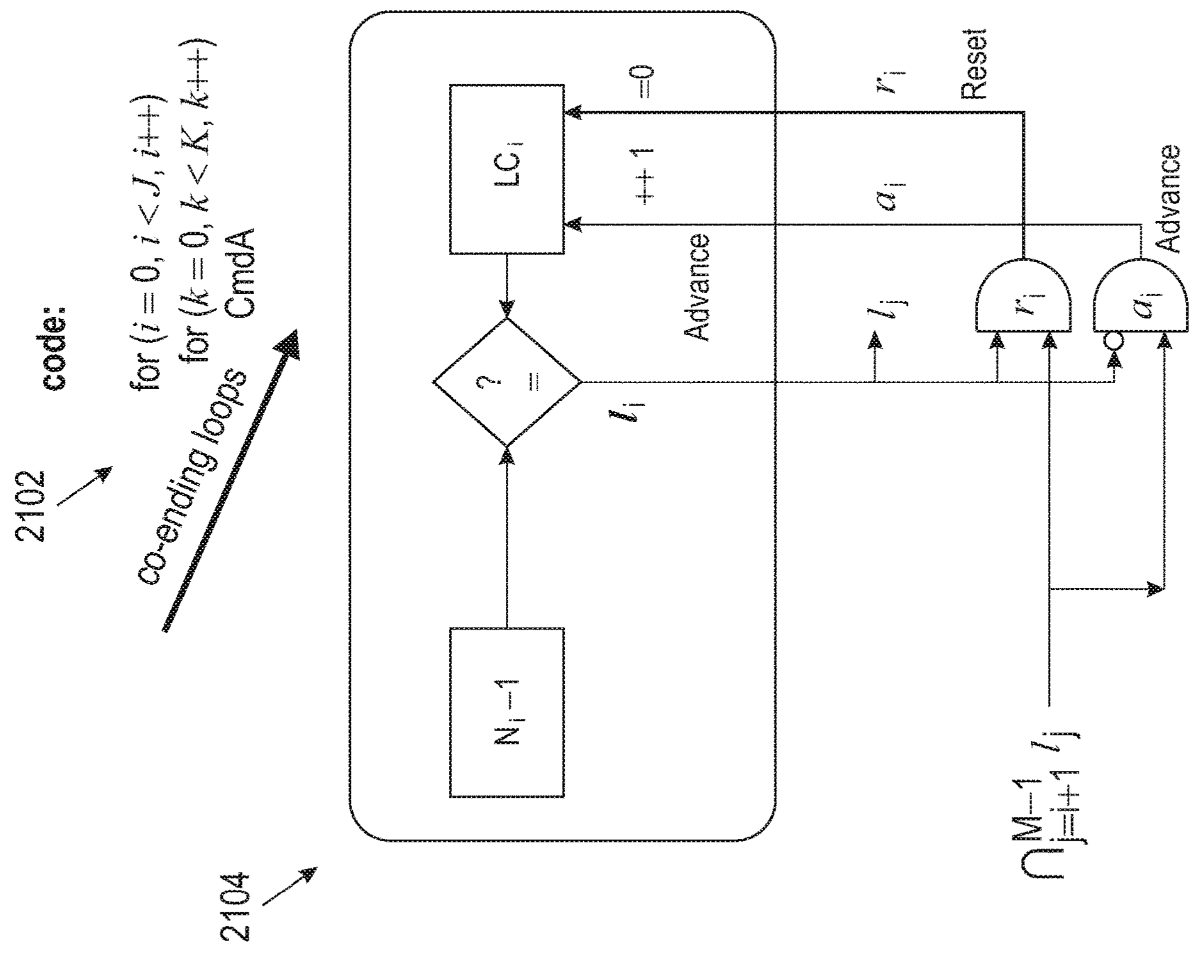

FIG. 21 depicts an exemplary embodiment of a parallel loops, without a program counter in accordance with the present disclosure. An advantage of the code depicted in block 2102 and the circuitry shown in 2104, is that all nested loop counters share the same loop body, thereby providing a reduced, minimal implementation that does not require a program counter. For example, the body of the nested loops is one instruction (or one function call). At each execution of the loop body the loop counters are updated. The system here is for M Loop Counters, numbered from 0 to M−1, with $LC_i$ denoting the i-th Loop Counter. Without loss of generality, it is assumed that if $LC_j$ and $LC_i$ are co-ending, and loop $LC_j$ is nested in loop $LC_i$ then j>i. $LC_i$ computes, at each loop body execution, the triggers as shown in block 2106.

Figure 22:
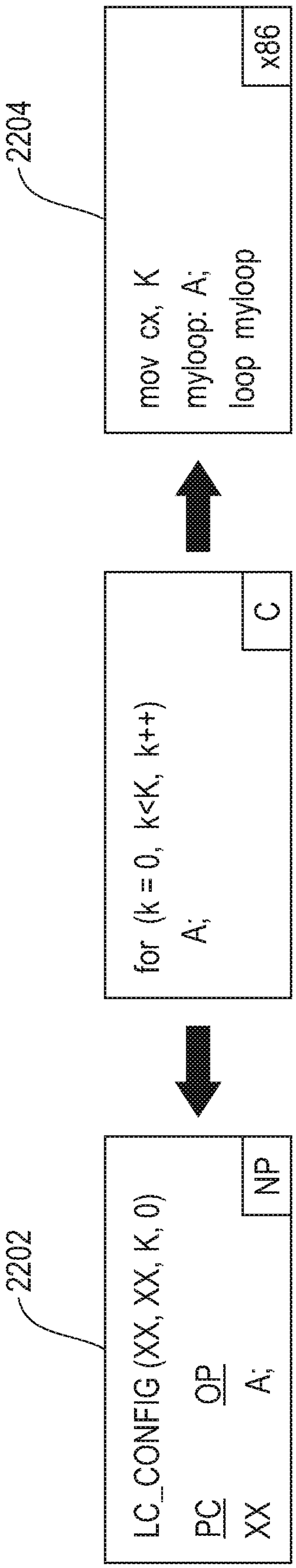
FIG. 22 illustrates an exemplary comparison of parallel loos to CPU loops according to embodiments of the disclosure.

FIG. 22 depicts a comparison of parallel loops and CPU loops, in accordance with the present disclosure, illustrating exemplary code blocks for a parallel loop 2202 and a CPU loop 2204. The parallel loops 2202 present a variety of attributes, including:

- Can be preconfigured in dedicated hardware
- Based on PC addresses
- Zero cycles overhead for loop iteration update
- Can simultaneously update multiple co-ending nested loops (while maintaining zero overhead)
- 100% utilization of computation cycles, independent of the number of nested loops and loop length
- Present specific implementation details:
  - Executed one or more times
  - Exit condition checked before incrementing (hence no counter increment after last iteration)
- Number of nested loops limited to available LC circuits (e.g., 16 Loop Counters)

In contrast, the CPU loop 2204 includes the following attributes:

- Programmed, which is part of the opcode in memory
- Flexible, data-driven loop conditions
- Overhead of 1-5 cycles for loop iteration update Co-ending nested loops are updated sequentially (sum of all updating loops overheads, not constant)

Utilization degrades as the number of nested loops increases, especially for short loops Implementation details:

Executed one or more times

Counter is incremented before checking exit condition (the counter increments once more after last iteration)

Unlimited number of nested loops

FIG. 23 depicts an exemplary embodiment of a loop re-configuration, in accordance with the present disclosure. As shown, in some embodiments, loop counters that are not currently counting (i.e., the program counter is not within their loop body) may be re-configured to implement other loops, at a different part of the program. For example, the code block 2302, has three loops, where A and C are the body of the first and second nested loops, respectively. As shown in code block 2304, the code can be implemented using just two loop counters, by re-configuring the second loop counter to loop on PC=1 for N iterations and then re-configuring it to loop on PC=4 for K iterations. The reconfiguring takes time for each iteration of loop j. In some embodiments, re-configuration can be done in parallel to executing an instruction, such as instruction B and instruction D, to reduce time.

Figure 24:
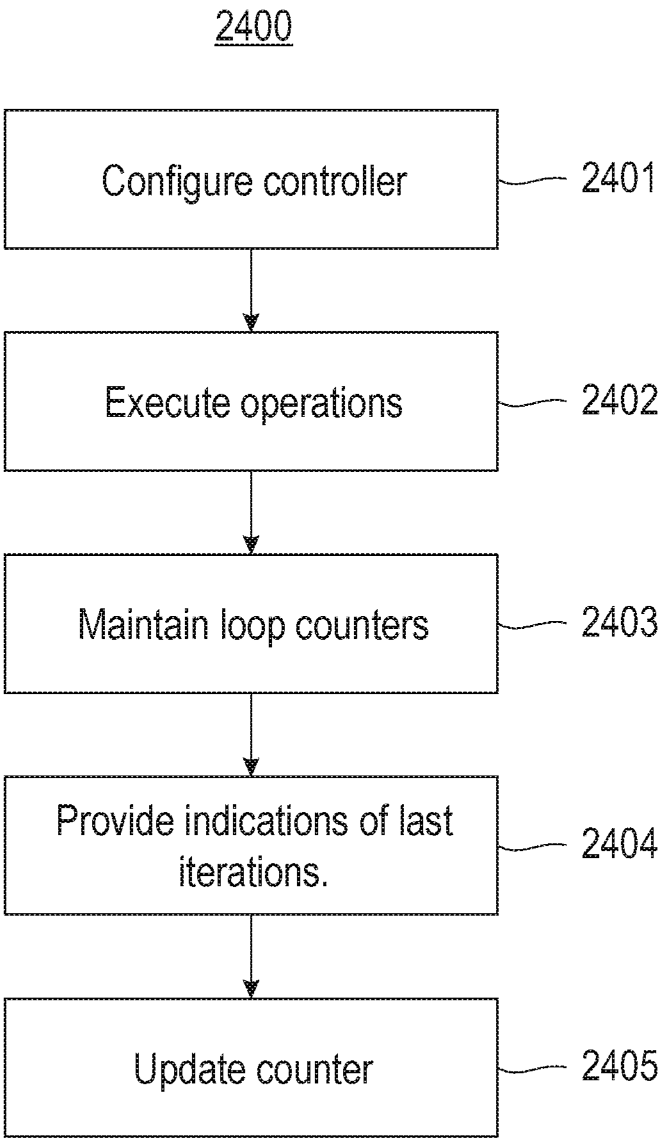
FIG. 24 illustrates a method for constant time program control of nested loops according to embodiments of the disclosure.

Referring to FIG. 24, a method for computing neural activations is illustrated. At 2401, a controller is configured according to a program configuration, the program configuration comprising at least one inner loop and at least one outer loop. At 2402, at least one arithmetic computing unit executes a plurality of operations according to the program configuration. At 2403, the controller maintains at least a first loop counter and a second loop counter, the first loop counter configured to count a number of executed iterations of the at least one outer loop, and the second loop counter configured to count a number of executed iterations of the at least one inner loop. At 2404, the controller provides a first indication of whether the first loop counter corresponds to a last iteration and a second indication of whether the second loop counter corresponds to a last iteration. At 2405, the second loop counter is alternatively incremented, reset, or maintained according to the first and second indications.

Figure 25:
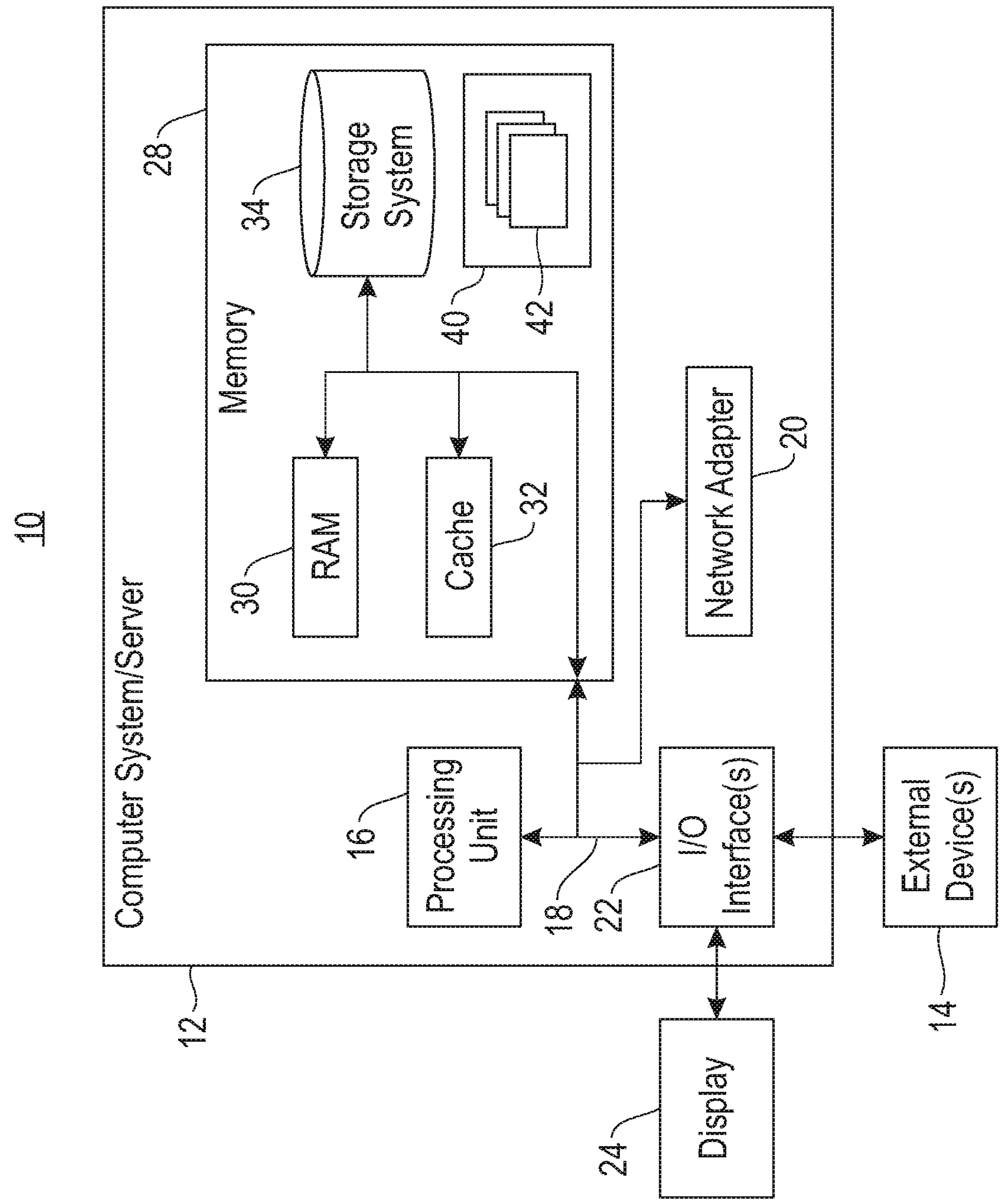
FIG. 25 illustrates a computing node according to embodiments of the disclosure.

Referring now to FIG. 25, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 25, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A chip, comprising:

at least one arithmetic-logic computing unit; and a controller operatively coupled to the at least one arithmetic-logic computing unit, wherein:

the controller is configured according to a program configuration, the program configuration comprising at least one inner loop and at least one outer loop, wherein the at least one outer loop comprises an infinite loop, the controller is configured to cause the at least one arithmetic computing unit to execute a plurality of operations according to the program configuration, the plurality of operations comprising an operation associated with the at least one inner loop, the controller being configured to cause the at least one arithmetic computing unit to execute the operation during a first clock cycle, the controller is configured to maintain at least a first loop counter and a second loop counter, the first loop counter configured to count a number of executed iterations of the infinite loop, and the second loop counter configured to count a number of executed iterations of the at least one inner loop, the controller is configured to provide, during the first clock cycle, a first indication of whether the first loop counter corresponds to a last iteration and a second indication of whether the second loop counter corresponds to a last iteration, the controller is configured to alternatively increment or maintain the first loop counter during the first clock cycle according to the first indication, the controller is configured to alternatively increment or reset the second loop counter during the first clock cycle according to the second indication, the controller is configured to maintain a program counter, the program counter indicating a current operation of the plurality of operations, and the controller is configured to provide a third indication of whether the current operation is a final operation of the inner loop.

2. The chip of claim 1, wherein the controller is configured to provide a fourth indication of whether the current operation is a final operation of the infinite loop.

3. The chip of claim 2, wherein the controller is configured to update the first and second loop counters and the program counter according to the first, second, third, and/or fourth indications, wherein the controller is configured to update the program counter when the second loop counter advances.

4. The chip of claim 1, wherein the controller is configured to update the first and second loop counters according to the program counter.

5. The chip of claim 1, wherein the controller is configured to maintain an idle indicator for each of the first and second loop counters.

6. The chip of claim 1, wherein the controller is configured to initialize the first or second loop counter to a predetermined value.

7. The chip of claim 1, wherein the inner and/or the at least one outer loop is bottom-driven.

8. The chip of claim 1, wherein the inner and/or the at least one outer loop is top-driven.

9. The chip of claim 1, configured to compute neural activations, wherein providing by the controller the third indication of whether the current operation is the final operation of the inner loop includes:

comparing the program counter to the last iteration;

in response to determining that the program counter is equal to the last iteration, comparing a current value of the second loop counter to a preceding value of the second loop counter during an iteration preceding the last iteration; and in response to determining that the current value of the second loop counter is equal to the preceding value of the second loop counter:

resetting the second loop counter, and incrementing the program counter.

10. The chip of claim 1, further comprising:

a memory in communication with the controller, wherein the controller is configured to receive the program configuration from the memory.

11. The chip of claim 1, wherein the program configuration comprises at least one additional nested loop, wherein the controller is configured to maintain an additional loop counter for each additional nested loop.

12. The chip of claim 1, wherein the controller is configured to increment the first loop counter or increment or decrement the second loop counter at each iteration.

13. A method comprising:

configuring a controller according to a program configuration, the program configuration comprising at least one inner loop and at least one outer loop, wherein the at least one outer loop comprises an infinite loop;

causing at least one arithmetic computing unit to execute a plurality of operations according to the program configuration, the plurality of operations comprising an operation associated with the at least one inner loop, the controller being configured to cause the at least one arithmetic computing unit to execute the operation during a first clock cycle;

maintaining by the controller at least a first loop counter and a second loop counter, the first loop counter configured to count a number of executed iterations of the infinite loop, and the second loop counter configured to count a number of executed iterations of the at least one inner loop;

providing by the controller a second indication of whether the second loop counter corresponds to a last iteration during the first clock cycle;

alternatively incrementing or maintaining the first loop counter according to the second indication during the first clock cycle;

alternatively incrementing or resetting the second loop counter according to the second indication during the first clock cycle;

maintaining by the controller a program counter, the program counter indicating a current operation of the plurality of operations; and providing by the controller a third indication of whether the current operation is a final operation of the at least one inner loop.

14. The method of claim 13, further comprising:

providing by the controller a fourth indication of whether the current operation is a final operation of the at least one outer loop.

15. The method of claim 13, wherein providing by the controller the third indication of whether the current operation is the final operation of the at least one inner loop includes:

comparing the program counter to the last iteration;

in response to determining that the program counter is equal to the last iteration, comparing a current value of the second loop counter to a preceding value of the second loop counter during an iteration preceding the last iteration; and in response to determining that the current value of the second loop counter is equal to the preceding value of the second loop counter:

resetting the second loop counter, and incrementing the program counter.

16. The method of claim 15, wherein providing by the controller the third indication of whether the current operation is the final operation of the at least one inner loop includes:

in response to determining that the current value of the second loop counter is not equal to the preceding value of the second loop counter:

incrementing second loop counter, and setting the program counter equal to a first iteration.

* * * * *